A. B. WALTERS.
Coffee Pot.
No. 90,707. Patented June 1, 1869.
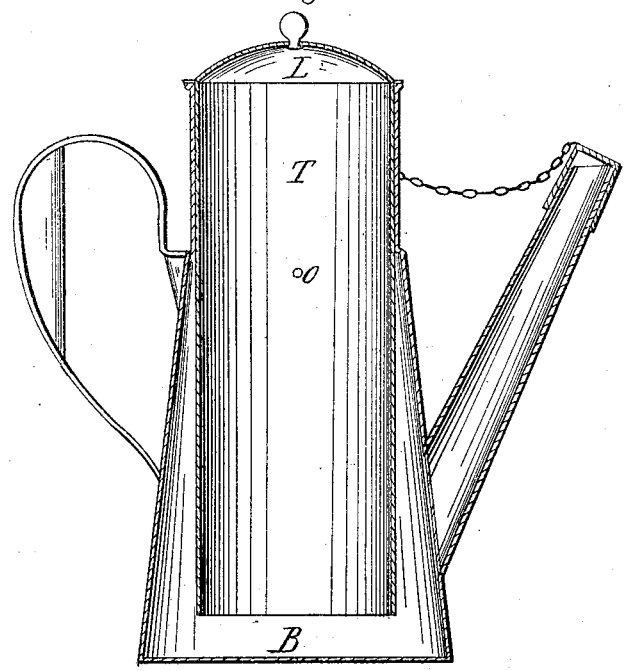
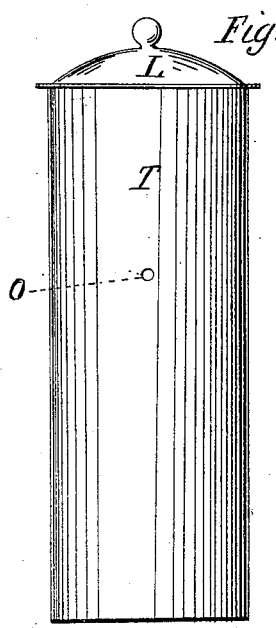
Witnesses;
Charles H. Evans
Isaac R. Oakford,
Inventor;
A. B. Walters

United States Patent Office.

ALMERN B. WALTERS, OF PHILADELPHIA, PENNSYLVANIA.

Letters Patent No. 90,707, dated June 1, 1869.

COFFEE-POT.

The Schedule referred to in these Letters Patent and making part of the same.

*To all whom it may concern:*

Be it known that I, ALMERN B. WALTERS, of the city of Philadelphia, county of Philadelphia, and State of Pennsylvania, have invented a new and useful "Improvement in Coffee-Pots;" and I do hereby declare that the following is a full, clear, and exact description thereof, reference being had to the accompanying drawings, and to the letters of reference marked thereon, in which—

Figure 1 is a sectional view of a coffee-pot with my improvement applied.

Figure 2 is a detached view of my improvement.

The nature of my invention consists in constructing or attaching to the under side of the lid of an ordinary coffee-pot, a tube which will extend down within a short distance from the bottom of the pot, for the purpose of retaining or condensing the aroma, and preventing it from passing off with the steam while the coffee is boiling.

To enable those skilled in the art to make and use my invention, I will now proceed to describe its construction and operation.

B is the body of an ordinary coffee-pot, the sides of which can be made straight or inclined as desired. The lid L, which encloses the upper part of the body B, has attached to it a long circular tube, T. Said tube is made in the form as shown in fig. 2, and is inserted in the coffee-pot so that the lower end of the tube will come within a short distance of the bottom of the pot, as shown in fig. 1. The diameter of the tube T is made to conform to the diameter of the straight part of the body B, so as to allow it to slide freely in and out, and be guided by it. In the side of the tube T, a short distance below the lid L, are made openings, O, for the purpose of allowing the steam as it expands to pass off.

In the operation of the pot, which is entirely enclosed, and made tight by means of the lid L and the cap over the spout, the steam from the liquid, while the coffee is boiling, will pass upwards in the tube T towards the lid L. This will cause the lid L and tube T to raise and fall, and thus always keep the aroma arising from the coffee in the pot. When there is an excessive pressure of steam, the tube T will rise so that the openings O will come above the upper edge of the body B, and thus allow the excess of steam to pass off, and the tube T to fall immediately afterwards. I am, therefore, enabled to retain the active principles or aroma of the coffee, at a small expense.

Having thus described my invention, its construction, and operation,

What I claim, and desire to secure by Letters Patent of the United States, is—

The application of the tube T, constructed as set forth, to the lid L of coffee-pots, substantially as and for the purpose specified.

In testimony whereof, I have hereunto signed my name, in the presence of two subscribing witnesses.

A. B. WALTERS.

Witnesses:
   CHARLES H. EVANS,
   ISAAC R. OAKFORD.